SIGNAL SYNCHRONIZER

Original Filed Nov. 16, 1955 2 Sheets-Sheet 1

INVENTOR.
J. PRESPER ECKERT, JR.
BY
Charles E. English
AGENT

INVENTOR.
J. PRESPER ECKERT, JR.
BY
Charles C. English
AGENT

United States Patent Office 3,204,228

Patented Aug. 31, 1965

3,204,228

SIGNAL SYNCHRONIZER

John Presper Eckert, Jr., Gladwynne, Pa., assignor to Sperry Rand Corporation, New York, N.Y., a corporation of Delaware Continuation of application Ser. No. 547,124, Nov. 16, 1955. This application May 3, 1961, Ser. No. 107,555
15 Claims. (Cl. 340—174.1)

The present invention is a continuation of my application S.N. 547,124, filed November 16, 1955, now abandoned, and relates to a synchronizer for signals appearing on a plurality of lines; and is more particularly concerned with a method and apparatus for aligning pulses, in time, received or read from a multi-channel storage tape apparatus.

Information is often recorded on webs or tapes, thereby to provide temporary or permanent storage of the said information. Such information is most often recorded as magnetized spots, as holes in the web, or as optically observable marks; and in the process of recording, the web or tape is caused to pass adjacent a recording transducer whereby the transducer impresses the desired information on the web. In many forms of information systems, this recording of information is accomplished in plural channels on the tape or web. Thus, the aforementioned recording transducer may comprise, for instance, a group of magnetic recording heads disposed on a line extending substantially transverse to the direction of motion of the said tape or web. Individual heads or transducers cooperate with individual channels or strips arranged in substantially parallel lines along the tape whereby information may be individually recorded on or read from such plural channels.

In recording systems of the type described above, the storage member or tape is caused to pass between guides adjacent opposed sides of the recording head or transducer, and these guides function to assure, as nearly as possible, a right-angular disposition between the transducer and tape during the recording or reproducing steps. In practice, it has been found that the tape width tends to vary somewhat along its length due to various manufacturing reasons; and because of this possible variation in width of the tape, the spacing between the aforementioned guides must be set to accommodate the greatest possible width of tape so that binding of the tape in the guides will not occur. As a result, when portions of the tape somewhat narrower than the widest dimension pass through the guides, some sidewise motion of the tape can take place; and in practice, this sidewise motion can take place either in the same direction with respect to a pair of adjacent guides or in opposite directions with respect to such adjacent guides. When the latter form of displacement occurs the tape is said to "skew," and such skew raises one of the major difficulties encountered in systems of the type described, in that time misalignment of information in the plural recording or reproducing channels can occur.

The way in which the tape will pass through the guides, when loosely confined, cannot in fact be predicted and will not be repeated from pass to pass. The tape may run against one guide during recording and against an opposite guide during playback. When the tape is properly aligned in the guides, it will pass across the read-record station at right angles to the said station; and when so properly aligned, information to be simultaneously recorded in several channels will be properly located in the tape. On the other hand, when the tape is loosely confined in the guide and rides against diametrically opposite guides, the aforementioned skew can occur and the angle of the tape across the read-record station will be other than 90° whereby information simultaneously recorded in plural channels will in fact be reproduced or read at differing times during a subsequent reproducing step.

The angle of skew, i.e. the deviation from 90°, in such a tape recording and reproducing system is of course, determined by the distance between the guides on each side of the recording head or transducer as well as by the difference between the tape width and the guide block spacing. If the tape guide tolerances can be held small and the guide distance made large, then the skew angle can be made diminishingly small. In a practical design, however, this may not be possible, and it is particularly difficult when tapes are to be recorded on one machine or apparatus and are to be played back on a second machine or apparatus. In this latter event, the tolerances can be cumulative and may in fact produce a relatively large skew angle.

As a result of this skew possibility in known tape recording systems, it has not been possible to record information as exactly as might be desired. By way of example, it should be noted that digital data is frequently recorded on magnetic tapes as spots of magnetization, and the magnetic materials presently used in such tapes can in fact resolve upwards of 500 pulses per inch. Such densities are usually unobtainable in practical apparatuses known to the present time, principally due to timing errors resulting from the aforementioned skew difficulties.

The present invention is directed primarily toward providing a method and apparatus for correcting errors due to skewing so that these high pulse densities can be effectively employed.

It is accordingly an object of the present invention to provide an improved method and apparatus for recording and reproducing information at high pulse densities.

A further object of the present invention resides in the provision of a skew compensated recording and reproducing system.

Still another object of the present invention resides in the provision of an improved information reproducing system having means for introducing a compensating time delay, or time skew, serving to cancel errors effected by mechanical skew in the system.

A further object of the present invention resides in the provision of an improved apparatus for synchronizing pulse groups occurring in parallel channels.

Still a further object of the present invention resides in the provision of an improved magnetic tape recording system having means compensating for possible mechanical skew during the recording or reproduction of information on the said tape.

Another object of the present invention resides in the provision of a novel synchronization system which is electrical in operation and which is more rapid than prior methods of synchronization.

A further object of the present invention resides in the provision of a tape recording and reproducing system having better operational characteristics and capable of more efficient operation and pulse storage than has been the case heretofore.

In providing for the foregoing objects, the present invention contemplates the provision of a tape recording system of the multichannel type wherein a control signal is impressed upon the tape during the recording of information signals; and this control signal is subsequently employed to determine the amount of mechanical skew in the system and to compensate therefor.

In practice, the control signal may be impressed upon a pair of channels disposed respectively adjacent opposing elongated sides of the recording tape or web; and a plurality of information channels may be located between the control channels and substantially parallel thereto. The signals placed in the control channels need not occur as frequently as those on the intermediate information channels; and in fact, these control signals may occur at some predetermined submultiple of the information signal rate. The only requirement is that the control signals occur sufficiently often to correct for the maximum amount of skew which might occur between adjacent control signals. When such control signals are employed, the present invention contemplates the detection of the control signals by a reproducing head or transducer substantially simultaneous with the reading of information stored in intermediate channels, and the control signals are utilized to provide a further signal which is proportional to the total angle of skew occurring in the tape between a recording and a subsequent reproduction operation. This further signal is in turn employed, in accordance with the present invention, to provide a variable delay between the actual detection and utilization of signals read from the intermediate storage channels, whereby the time relationship between information recorded on the said information channels is maintained at an ultimate output of the system despite possible errors due to mechanical skew.

The above objects, advantages, construction and operation of the present invention will become more readily apparent from the following description and accompanying drawings in which.

Figure 1:
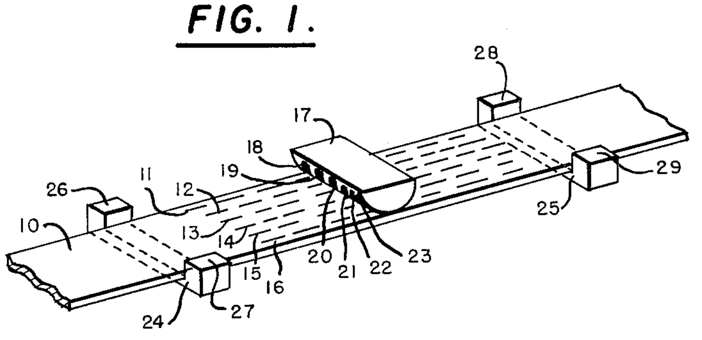
FIGURE 1 is illustrative of a multichannel recording system in accordance with the present invention.

Referring now to FIGURE 1, it will be seen that, in accordance with the present invention, a tape 10, for instance of magnetic material, may be adapted to record information in a plurality of channels identified as 11 through 16 inclusive; and such recording may be effected by causing the said tape to pass adjacent a transducer 17 having plural control elements 18 through 23 inclusive. Transducer 17 may in fact be adapted to both record and read information in the plural channels 11 through 16, under the control of external circuits; or may be singly adapted to either operation. Tape 10 is ordinarily guided adjacent the transducer 17 by a pair of guide assemblies 24 and 25 having guide blocks 26–27 and 28–29 respectively. The arrangement is such that under normal circumstances the transducer 17 is disposed substantially transverse to the direction of motion of tape 10, or at some predetermined and fixed angle thereto, whereby the time of occurrence of pulses coupled to the elements 18 through 23 of transducer 17 will be effected as a corresponding positional disposition of pulses in the several channels 11 through 16.

As discussed previously, the tape 10 may at times be loosely confined in the guide assemblies 24 and 25 between blocks 26–27 and 28–29; and such loose confinement may result, for instance, from a variation in tape width. When such loose confinement is present, the position of tape 10 in passing adjacent transducer 17 is not uniquely defined or maintained. For example, the tape 10 may run in contact with guide blocks 26 and 28 or in contact with guide blocks 27 and 29. In these particular forms of operation, tape 10 will normally pass orthogonal to transducer 17, or at the aforementioned predetermined angle thereto, and hence no tape skew, with a resultant time misalignment of pulses, occurs. These particular situations are in fact of no particular concern in the present invention.

On the other hand, the tape 10, when loosely confined, may run in contact, for instance, with blocks 26 and 29 on a first pass adjacent transducer 17 and may thereafter run in contact with blocks 27 and 28 during a second pass adjacent the transducer 17 or adjacent a corresponding transducer in another apparatus. When this form of tape operation occurs, a considerable error is introduced between the recording and reproducing of information on the several channels. Thus, even though pulses might be recorded simultaneously in channels 11 and 16 for instance, the mechanical skew described will result in pulses in channel 16 arriving adjacent transducer 17 at a time sooner than simultaneously recorded pulses occurring in channel 11. Thus, notwithstanding the simultaneity of recording in the most widely spaced channels 11 and 16, the mechanical skew introduced, due to necessary spacing of the guide blocks, will result in the destruction of this synchronization. The channels between the outermost channels 11 and 16 will be desynchronized by differing amounts, with the channels closest to channel 16 being advanced in time and the channels closest to channel 11 being retarded in time. It follows, of course, that a channel at the center of the tape is unaffected in timing by mechanical skews in the system.

The aforementioned skew errors may be compensated, in accordance with the present invention, by recording control signals in the outermost channels 11 and 16 during the recording of information on intermediate channels such as 12 through 15. The control signals preferably take the form of pulses simultaneously recorded in each of the control channels 11 and 16, and these pulses are utilized during a reproducing operation to determine whether skew has occurred and to further determine the amount of this skew. If pulses simultaneously recorded in opposed channels 11 and 16 are thereafter detected at the same time, no skew has occurred, and no compensating control need be effected. On the other hand, if mechanical skew does occur, the outermost channels 11 and 16 will be most sensitive to this skew and control pulses will occur in one of the control channels 11 or 16 at a time sooner than the occurrence of simultaneously recorded pulses in the other of the control channels. This possible variation in control pulse time occurrence is utilized, in accordance with the present invention, to effect a variable delay of proper magnitude to restore the time alignment of information signals recorded on information channels intermediate the control channels.

Figure 2:
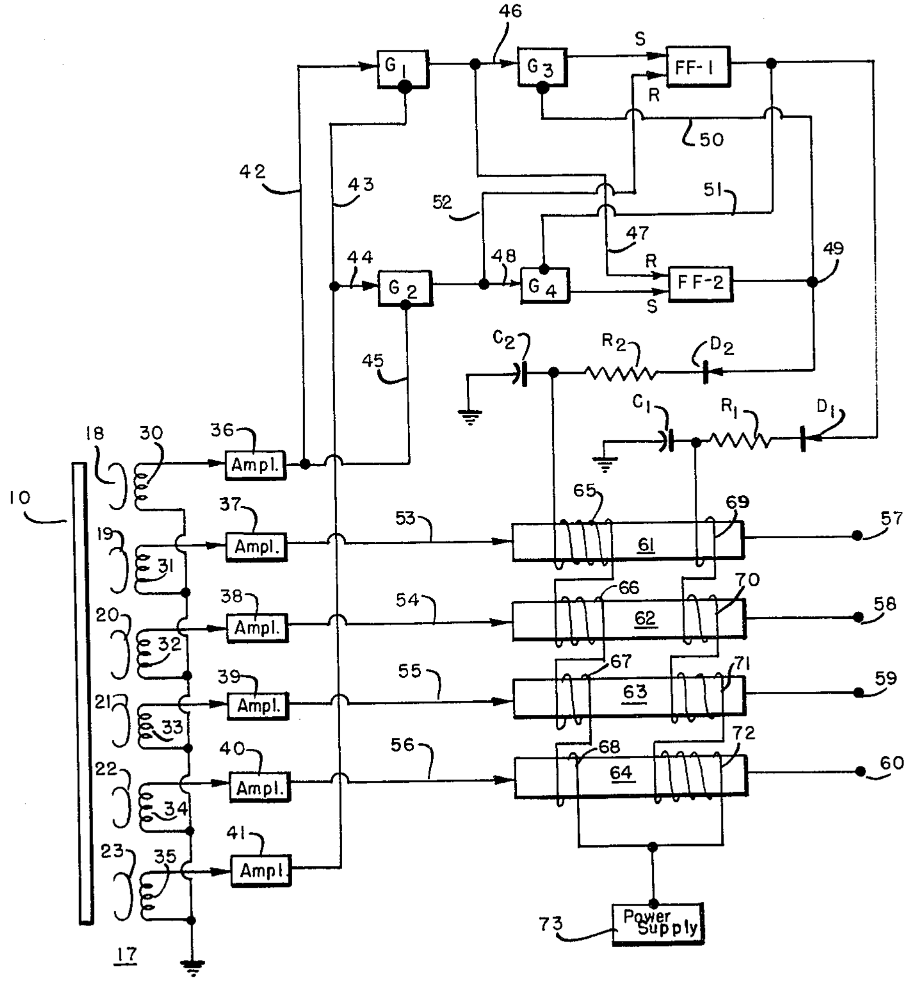
FIGURE 2 is a schematic diagram of a control circuit adapted to provide skew compensating delays in accordance with the present invention.

This compensation may be effected, in accordance with one embodiment of the invention, by a circuit of the type illustrated in FIGURE 2. Thus, referring to FIGURE 2, it will be seen that, as before, the tape 10 is caused to pass adjacent transducer 17 and this transducer comprises, as described, pole pieces 18 through 23 cooperating with coils 30 through 35 inclusive, for the recording of signals in plural channels or tracks adjacent the pole pieces 18 through 23 respectively. In practice, pole pieces 18 and 23 are disposed adjacent the outermost opposed edges of the tape 10 and cooperate with channels having control signals simultaneously impressed therein. Outputs produced across the several coils 30 through 35 are coupled to a variable time delay circuit by amplifiers 36 through 41 inclusive. Such amplifiers are usually required in most playback operations, but may be omitted if the signals across elements 18 through 23 and across their corresponding coils 30 through 35 are sufficiently strong.

The two outermost elements 18 and 23 are most sensitive to tape skew, as previously discussed, and signals recorded adjacent these elements can thus be conveniently used as a measure of tape skew. It will be appreciated that if pulse type signals are recorded on the outermost channels adjacent elements 18 and 23 at the time that the information is recorded on the intermediate channels 19 through 22, then any mechanical skewing of the tape 10 during playback will produce a corresponding phase or time difference between the outermost channel signals. The control signals detected by outermost elements 18 and 23 are coupled via their corresponding amplifiers 36 and 41 to a pair of gates G1 and G2. As illustrated in FIGURE 2, the gates G1 and G2 are each of the inhibition type, such gates being well known in the art; and the output of amplifier 36 is caused to provide a selective input to gate G1 via line 42, while the output of amplifier 41 provides selective inhibition to the gate G1 via a line 43. Similarly, the output of amplifier 41 provides a selective input to gate G2 via line 44 while the output of amplifier 36 selectively inhibits gate G2 via line 45.

In operation, if simultaneously recorded control signals should appear at the same time at the outputs of amplifiers 36 and 41, each of gates G1 and G2 will be inhibited and no output will pass to the remainder of the circuit. If, on the other hand, skew should occur, signals will appear at the output of amplifiers 36 and 41 at differing times dependent upon the amount of skew and the direction of skew.

The outputs of gates G1 and G2 are coupled to a further pair of gates G3 and G4 as well as to one control terminal at each of a pair of flip-flops FF–1 and FF–2. Flip-flops FF–1 and F–2 comprise structures which may be "set," by a signal appearing at the S terminal, into an output-producing state; or which may be "reset," by a signal appearing at the R terminal, into a no-output producing state. By the arrangement shown, the output of gate G1 passes an input to gate G3 and further serves to reset flip-flop FF–2. By analogy, the output of gate G2 passes an input to gate G4 and serves to reset flip-flop FF–1. The outputs of flip-flops FF–1 and FF–2 in turn servo to selectively inhibit gates G4 and G3 respectively.

Because of this disposition of gates and flip-flops, a signal will be produced at the output of one or the other of flip-flops FF–1 and FF–2 having a width corresponding to the amount of mechanical skew occurring in the system; and which of the flip-flops FF–1 and FF–2 is in such an output producing state will be dependent upon the direction of skew in the system. If we should assume for instance that the skew is such that amplifier 36 produces a control pulse output prior in time to amplifier 41, this control pulse will pass via uninhibited gate G1 to the input of gate G3 via line 46 as well as to the reset input of flip-flop FF–2 via line 47. During this time, the output of amplifier 36 positively inhibits gate G2 thereby preventing the passage of pulses to gate G4 via line 48, whereby the inhibition of gate G2 as well as the resetting of flip-flop FF–2 assures that no output appears at point 49 at the output of flip-flop FF–2. Due to this lack of output from flip-flop FF–2, no inhibition is applied to gate G3 via line 50 and the pulse output of gate G1, occurring on line 46, passes via gate G3 to the set input of flip-flop FF–1 causing the said flip-flop FF–1 to assume an output producing state.

This output from flip-flop FF–1 is coupled via a line 51 to the inhibition terminal of gate G4 assuring that gate G4 remains inhibited; and the output of flip-flop FF–1 will continue until the next subsequent control pulse occurs at the output of amplifier 41. This next subsequent output pulse, occurring at a time after the initial occurrence of the output of amplifier 36, which time is representative of the mechanical skew in the system, is coupled via line 44 to the now uninhibited gate G2 and passes via the said gate G2 and via line 52 to the reset input of flip-flop FF–1 causing the said flip-flop FF–1 to assume a non-output producing state. This output pulse from gate G2 will not pass via gate G4 to the set input of flip-flop FF–2 since gate G4 is still inhibited by the flip-flop FF–1 output.

The action is such therefore that flip-flop FF–1 rises to an output producing state upon occurrence of a first pulse from amplifier 36 and is reset to a non-output producing state upon the occurrence of a next subsequent control pulse from amplifier 41. The output of flip-flop FF–1 thus comprises an output signal having a width corresponding to the amount of skew in the system, when the pulses appearing adjacent element 18 lead the pulses appearing adjacent element 23. By analogy, it will be seen that flip-flop FF–2 provides a similar variable width output when skew occurs in the opposite direction, namely, control pulses in amplifier 41 lead corresponding control pulses in amplifier 36.

The variable width output of flip-flop FF–1, when it occurs, is coupled via a rectifier D1 to an integrating circuit R1–C1 whereby a variable amplitude potential is developed across capacitor C1 proportional to the amount of skew in one direction in the system. Similarly, the output of flip-flop FF–2, when it occurs, is coupled via rectifier D2 to an integrating circuit R2–C2 whereby a potential is produced across capacitor C2 of a magnitude proportional to the mechanical skew in the system in an opposite direction. This potential across one or the other of capacitors C1 and C2 is utilized to introduce a variable delay in the intermediate information channels 53 through 56 inclusive, whereby outputs will appear at output points 57 through 60 at times corresponding to the original relative times of recording.

This variable delay is provided by a plurality of variable delay lines, preferably comprising magnetostrictive elements 61 through 64 inclusive having control coils 65 through 68 and 69 through 72 thereon. Such variable magnetostrictive delay lines have already been taught, for instance, in the application of Theodore H. Bonn, Serial No. 499,285, filed April 5, 1955, for: "Variable Delay Line," which application has been assigned to the assignee of the instant application. As discussed by Mr. Bonn, such a variable delay line may be effected by imposing a variable bias on a magnetostrictive line; and this variable bias not only physically shortens the line, but also changes the acoustic velocity of waves traveling therein. If large control fluxes are produced in the line, the acoustic waves impressed thereon will travel the length of the line in a shorter time than if no control flux is produced; and varying delays between these extremes may be effected by suitably varying the amount of control flux impressed on the line. Signals may be introduced to and read from such a magnetostrictive delay line by magnetic transducers, for instance, (not shown).

Returning now to FIGURE 2, it will be seen that control windings 65 through 68 for instance, are connected in series, and the series connected control windings so effected are connected at one of their ends to the capacitor C2; and are connected at the other of their ends to a power supply 73. Similarly, the control windings 69 through 72 are series connected and these windings are coupled at one of their ends to the capacitor C–1 and are coupled at the other of the ends to the said power supply 73. The number of turns in the aforementioned sets of series connected windings vary progressively in the delay elements 61 through 64, whereby winding 65 has appreciably more turns than winding 68 while winding 72 has appreciably more turns than winding 69.

The several windings 65 through 68 and 69 through 72 may be solenoid wound along the rod; or in the alternative, they may be layer wound one upon the other or they may comprise bifilar windings. The total number of turns on each of the elements 61 through 64, comprising the two individual coils carried thereby, is constant; but the ratio between windings in adjacent delay lines and associated with a given set of series connected windings varies in some predetermined relationship. Thus, the ratio between windings 67 and 66 as well as between windings 70 and 71 may for instance be 2:3, while the ratio between windings 65 and 68 as well as between windings 72 and 69 may be for instance 4:1. It must be stressed that the ratios so specified, as well as the representations of delay means and winding turns in FIGURE 2, are merely illustrative; and the actual number of delay elements employed, as well as the relative delays which are imposed thereby, will depend upon the requirements of each particular system.

By this arrangement, therefore, and inasmuch as only one of capacitors C1 or C2 has a control potential across it at any given time, the signals appearing in lines 53 through 56 are variably delayed, and the amount and relative directions of these delays are such as to compensate for the amount and direction of the aforedescribed mechanical skew. Thus, if capacitor C2 should produce an output representative of the fact that signals in element 23 occur prior to signals in element 18, a current will pass via series connected windings 65 through 68 thereby impressing control fluxes upon elements 61 through 64 to vary the amount of delay imposed by each of these control elements. Signals appearing on line 53 will thus be passed to output terminal 57 in a shorter time than is the case for the passage of signals from line 56 to output terminal 60. The intermediate lines will be intermediately delayed.

By analogy, when capacitor C1 produces an output representative of signals occurring in element 18 sooner than signals occurring in element 23, an opposite delay control will be imposed upon the lines 61 through 64 whereby line 61 effects a greater delay than does line 64; again compensating for the mechanical skew in the system.

Figure 3:
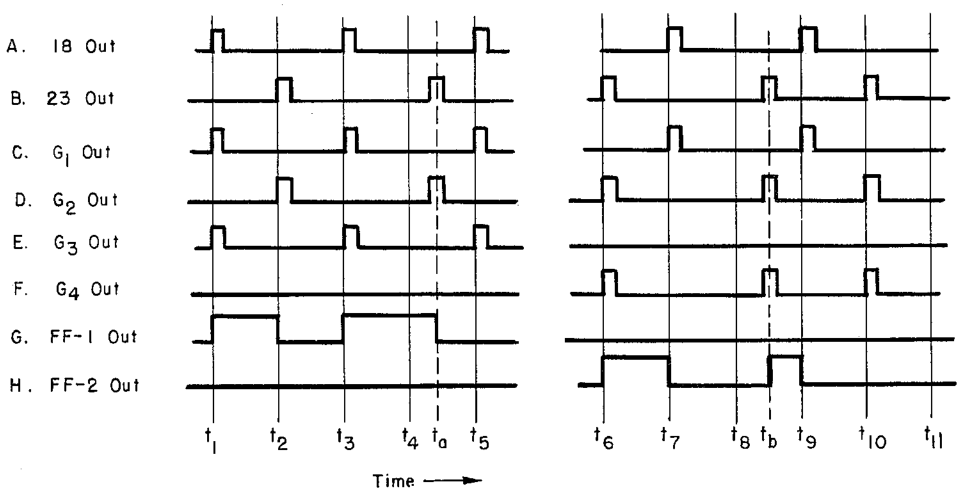
FIGURE 3 (A through H) are waveforms illustrating the operation of the circuit shown in FIGURE 2.

The foregoing operation will be readily seen from an examination of the waveforms illustrated in FIGURE 3; and these waveforms have been so chosen that the pulses for times *t1* through *t5* represent a situation in which control pulses occur in element 18 at a time in advance of those occurring at element 23; while the waveforms for times *t6* through *t11* represent a situation in which control pulses occur adjacent element 23 at a time in advance of those occurring adjacent element 18. The operation of the circuit shown in FIGURE 2 has already been discussed; and in accordance with that discussion it will be seen that if the pulses in channel 23 should lag pulses in channel 18 by a time *t1* to *t2*, the flip-flop FF–1 will produce a signal output having this width. Similarly, if the pulses in channel 23 should lag the pulses in channel 18 by a time *t3* to $t_A$, the flip-flop FF–1 will once more produce an output signal, this time having a width *t3* to $t_A$. Similarly, if the pulses in channel 23 should lead pulses in channel 18 by a time *t6* to *t7*, flip-flop FF–2 will produce an output signal having a width *t6* to *t7*; while if the pulses in channel 23 should lead the pulses in channel 18 by a smaller time interval $t_B$ to *t9*, flip-flop FF–2 will again produce a smaller width output corresponding to this time misalignment.

As mentioned previously, the control pulses recorded on the outermost channels corresponding to elements 18 and 23 need not arrive as frequently as those on the intermediate channels corresponding to elements 19 through 22. In fact it may be preferable to record pulses on the tape 10 in these outermost control channels at some fraction of the rate than information pulses occur in the intermediate channels. The system described above can nevertheless correct for mechanical skew provided that the skew does not exceed one pulse period of the outer channels corresponding to elements 18 and 23. The correction signals so obtained, however, can govern intermediate channels having more pulses per unit length of tape. Thus, the pulse density of the other channels will be determined not by the pulse density of the intermediate channels but rather by the maximum amount of skew which can occur.

Naturally, it is desirable not to make the pulse density of the control channels corresponding to elements 18 and 23 too low or the value of the skew error can change appreciably between control pulses. However, by appropriate selection of the control pulse density, complete compensation for mechanical skew can be effected through the provision of variable delays responsive to the correction signals for so modifying the time relationships of information pulses detected by a transducer that the original alignment and synchronization of the pulses is restored despite mechanical skew in the system.

While a preferred embodiment of the present invention has been described, many variations will be suggested to those skilled in the art. The variable delay components may, for instance, be interposed between the output of the several transducer portions and the input to their corresponding amplifiers rather than in the manner illustrated in FIGURE 2. Other forms of control systems serving to derive a correction signal corresponding to the time misalignment of control pulses will also be apparent to those skilled in the art; and the foregoing description is therefore meant to be illustrative only and should not be considered limitative of my invention. All such variations as are in accord with the principles described are therefore meant to fall within the scope of the appended claims.

Having thus described my invention, I claim:

1. In a skew compensated reproducing system, an information storage member having a pair of spaced control tracks for supplying control signals and a plurality of information signal tracks, logical means responsive to the relative time occurrence of corresponding ones of said control signals from said control tracks for deriving a correction signal proportional in duration to the mechanical skew of said member, and delay line means responsive to said correction signal for variably delaying the propagation of information signals from each of said information signal tracks.

2. The system of claim 1 wherein said control tracks and said information signal tracks are substantially parallel to one another, said signal tracks being located between said control tracks.

3. The system of claim 2 wherein said storage member comprises a magnetic tape.

4. The system of claim 1 wherein said means for deriving said correction signal comprises a flip-flop producing a variable width signal dependent upon the time displacement between corresponding signals in said pair of control channels, and means for integrating said variable width signal to derive a variable amplitude correction signal.

5. The system of claim 4 wherein said delay line means for variably delaying said information signals comprises a variable acoustic delay line controlled by said variable amplitude control signal.

6. In a skew compensated recording and translating system, a recording tape means for recording signals in a plurality of spaced channels disposed in said tape, two of said channels having only control signals therein and others of said channels having only information signals therein, means for translating said control signals from said control channels, logical network means for deriving a correction signal dependent in amplitude upon the translation time displacement between corresponding signals in said control channels, means for translating the information signals in said information channels, and delay line means responsive to said correction signal for variably time delaying said translated information signals.

7. The system of claim 6 wherein said means for deriving a correction signal comprises a flip-flop responsive to a first signal appearing in one of said control channels for assuming a first output producing state, and responsive to a next successive signal appearing in the other of said control channels for assuming a second output producing state opposite to said first state, whereby the output of said flip-flop comprises a variable signal corresponding in width to the reproduction time displacement between signals in said control channels.

8. The system of claim 7 wherein said delay line means for delaying said reproduced information signals comprises a signal responsive variable delay line, means for integrating said variable width signal whereby said correction signal comprises a variable amplitude signal, and means coupling said variable amplitude signal to said delay line.

9. In a skew compensated recording system, a magnetic tape having a pair of control channels disposed adjacent the opposed edges thereof, each of said control channels having a plurality of spaced control pulses therein, there being a pulse in each of said channels having a corresponding pulse in the other of said control channels, a plurality of information signal channels spaced from one another between said control channels, first translating means for translating the signals in said control channels, logical network means producing a variable amplitude correction signal dependent upon the time displacement between corresponding reproduced pulses in said pair of control channels, second translating means for translating the information in said information signal channels, and delay line means responsive to said correction signal for variably altering the output of said second translating means.

10. The combination of claim 1 wherein said means for deriving a correction signal comprises first means for producing a first correction signal in response to mechanical skew of said member in a first predetermined direction, and second means for producing a second correction signal in response to mechanical skew of said member in a second predetermined direction, said delay line means for variably delaying the propagation of information comprising means responsive to both said first and second correction signals whereby the propagation of said information is variably delayed in response to both the direction and magnitude of said mechanical skew.

11. In combination, a record member having a plurality of spaced control signals recorded therein in a plurality of channels, said record member further having an information signal recorded therein, transducer means, means for effecting relative motion between said record member and said transducer means whereby said transducer means reproduces said control and information signals, logical network means coupled to said transducer means and responsive to variations in the occurrence time of corresponding ones of said spaced control signals at the output of said transducer means for producing a correction signal which varies in duration with variations in the direction and magnitude of mechanical skew present during occurrence of said relative motion between said record member and said transducer means, utilization means, and delay line means responsive to said correction signal for controlling the passage time of said information signal from the output of said transducer means to said utilization means.

12. A skew compensating reproducing system comprising an information storage member having a pair of parallel spaced control signal tracks and a plurality of parallel information storage tracks thereon, transducer means for deriving signals from said tracks, a plurality of variable delay lines coupled respectively to said information storage tracks via said transducer means thereby to propagate information signals derived from said information signal tracks, means associated with said transducer for deriving a single correction signal from said control signal tracks proportional in amplitude to skewing of said information storage member and means for applying said correction signal in varying amounts to said delay lines, the amount of delay imposed on each information signal thereby being determined by the amplitude of said correction signal so that the information signals are maintained in synchronization with each other regardless of skewing of the information storage member.

13. In a skew compensated reproducing system, an information storage member having a pair of spaced control tracks for supplying control signals and a plurality of information signal tracks, logical means responsive to the relative time occurrence of corresponding ones of said control signals from said control tracks for deriving a correction signal proportional in duration to the skew of said member, and means separately associated with each of said information signal tracks and responsive to said correction signal for variably delaying the propagation of information signals from each of said information signal tracks after said information signals have been received by said last-mentioned means.

14. In a skew compensated recording system a storage member having a pair of spaced control tracks for timing signals to be recorded thereon and each control track having signals thereon which correspond with signals on the other control track, a plurality of information tracks intermediate said control tracks and substantially parallel thereto, logical network means responsive to the relative time occurrence of corresponding ones of said timing signals in said control tracks for deriving a control signal proportional in amplitude to the skew of said member, reading means for detecting information stored in said intermediate information tracks, and separate means coupled to each of said reading means responsive to said control signal for variably delaying propagation of information detected by said reading means.

15. In a skew compensated recording system, a storage member having a pair of spaced control tracks for timing signals to be recorded thereon, a plurality of information tracks intermediate said control tracks and substantially parallel thereto, logical network means responsive to the relative time occurrence of corresponding ones of said timing signals in said control tracks for deriving a control signal proportional in amplitude to the skew of said member, reading means for detecting information stored in said intermediate information tracks, and delay line means responsive to said control signal for variably delaying propagation of information detected by said reading means, a plurality of output channels coupled to said reading means whereby each of said output channels carries information from said plurality of information tracks to a plurality of output points respectively, said delay line means for variably delaying information comprising a plurality of variable delay line means disposed in each of said output channels respectively, and means for coupling said control signal to each of said variable delay line means simultaneously, said plurality of variable delay line means respectively being variably responsive to said control signal whereby the coupling of said control signal to said plurality of delay line means causes said delay line means to exhibit different time delays relative to one another.

References Cited by the Examiner

UNITED STATES PATENTS

| | | | |
|---|---|---|---|
| 2,751,439 | 6/56 | Burton | 340—174.1 |
| 2,828,478 | 3/58 | Johnson | 340—174.1 |

FOREIGN PATENTS

| | | |
|---|---|---|
| 762,699 | 12/56 | Great Britain. |

IRVING L. SRAGOW, *Primary Examiner.*